2,739,885

METHODS OF PRODUCING PHOSPHATIC FERTILIZERS

Leroy Henry Facer, Phelps, N. Y., assignor, by mesne assignments, to Glen E. Cooley, Schenectady, N. Y., Warren Dunham Foster, Ridgewood, N. J., Halfdan Gregersen, New York, N. Y., Magnus I. Gregersen, Englewood, N. J., and Dana S. Lamb, New York, N. Y., trustees No Drawing. Original application July 9, 1942, Serial No. 450,324. Divided and this application January 10, 1952, Serial No. 265,921

18 Claims. (Cl. 71—64)

As is well known to the practitioners of the fertilizer art, the three major products of importance in any complete or mixed fertilizer are nitrogen (N), phosphorus ($P_2O_5$), and potash ($K_2O$). The material most widely used as a source of phosphates, either in a mixed fertilizer or alone, is superphosphate. Superphosphate generally is made by treating ground phosphate rock with sulphuric or other strong mineral acid in order to convert the phosphate in the rock, which is in a form in which it cannot be used by the plant, to a form in which it can be so used.

In my co-pending application, Serial Number 432,350, filed February 5, 1942, called herein the "ultimate parent" hereof, and in the various applications of which said application is a continuation-in-part, I describe methods whereby I produce improved phosphatic fertilizers, preferably but not necessarily pelleted, which are of greatly improved physical condition and contain a novel acidic truly water-soluble salt or salts having the characteristics and behavior of a hypophosphite in association with monophosphate. This product per unit of phosphate results in greater crop growth. In my co-pending parent application, Serial Number 450,324, filed July 9, 1942, now forfeited, called herein the "immediate parent" hereof, which is a continuation-in-part of said application 432,350 and of which this application is a division, I describe and claim other processes all depending upon processing a phosphatic or related component or one containing a metallic (minor) element either by a direct use of materials which conventionally are either wasted or must be expensively reprocessed for effective use, or by the use of such materials in a manner to produce at one practically continuous two-stage operation both a major product and a minor but important by-product. As in my parent application this invention is particularly concerned with the maximum utilization of a strong mineral acid or acids in a manner which saves time, labor, expense of operation and materials, reduces capital investment and by shortening necessary curing time cuts capital required for inventories. I also secure an improved product, physically and chemically.

An object of this invention therefore is to make maximum utilization of sulphuric or other strong mineral acid for the production of improved phosphatic fertilizers so that a minimum amount accomplishes a maximum result. A related object is advantageously to employ a second time without treatment types of sulphuric acid which previously have required expensive purification or concentration before they can be used again, as is particularly important whenever there is a severe shortage of sulphuric acid. This object includes use of sludge sulphuric acid which is a by-product particularly of the petroleum industry. I employ such sludge or other low grade acid before extensive treatment and while it is still gummy and sticky and contains a considerable amount of oils, gums or other impurities. A highly important object of my invention is to save in the amount of both freshly produced and other sulphuric acid necessary to produce a given amount of $P_2O_5$ and at the same time to produce a fertilizer which per unit of $P_2O_5$ has greater crop-producing capacities as explained fully in my said co-pending applications and outlined herein.

In making phosphate products by so-called "wet" methods I have found it particularly advantageous to divide ground phosphate rock on the basis of fineness of grinding and to apply the entire amount of acid, of whatever character, necessary for the acidulation of the entire amount of rock to the coarsely ground portion and later to add to that mixture the remaining finely ground rock. In order to secure maximum penetration of phosphate rock by the acid many practitioners grind the rock very fine, thus adding to the cost. Moreover, rock which is finely ground when mixed with a strong acid, particularly phosphoric, is likely to form a compact mass which is very difficult to handle and under certain circumstances must be broken up, with consequent added expense and exposure of workers to harmful dust. To avoid such difficulties the use of dilute acid has been extensive, particularly in making phosphatic products of higher concentrations and with the use of phosphoric instead of sulphuric acid. This expedient leaves moisture which must be expelled by heat. On the other hand if dilute acid of an amount necessary to complete their acidulation is applied to coarsely ground particles the penetration is not satisfactory. Such difficulties, which are overcome by my novel methods, have been particularly outstanding in the manufacture of triple superphosphate (a product of about 50 per cent $P_2O_5$), which requires the use of phosphoric acid, as is explained at length in my co-pending application Serial Number 221,931, filed April 19, 1951, likewise a division of the immediate parent hereof. Similar disadvantages, which also I have overcome, apply to the making of phosphoric acid and enriched superphosphate, as stated in my co-pending application, Serial Number 221,932, filed April 19, 1951, likewise a division of said immediate parent.

An object of this invention is to apply to the making of superphosphate of ordinary concentration methods similar to those which I use in the making of triple superphosphate, enriched superphosphate and phosphoric acid. The present application utilizes the above principles with sulphuric acid, without the addition of other components that react with phosphate rock in the mixing operation, as the reactant. Thus I acidulate phosphate rock on the basis of coarse and fine grinding in the production of superphosphate of ordinary concentration—say as between 16 and 20 per cent.

According to this invention I grind phosphate rock relatively coarsely and divide on the basis of particle size. I first apply all of the sulphuric acid necessary to convert all or substantially all of the unavailable phosphorus of all of the rock to usable or available forms. I thus secure an over-acidulated mass, the exact physical characteristics obviously depending upon the chemical characteristics of the rock which is employed and the fineness of grinding. Thereupon I utilize this acidic component and complete the acidulation of the superphosphate by the addition of the finer particles of rock. This total mixing operation takes no more power than is normally employed with coarsely ground rock. The result is maximum penetration, a complete utilization of substantially all of the moisture as water of crystallization and the securing of the peculiar chemical results of my parent process, provided certain critical steps are employed.

I may grind phosphate rock so that 100% passes through a 50 mesh screen, such grinding according to the standards of this industry being very coarse and relatively inexpensive. I then separate this material into that which remains on a screen of say 100 meshes per square inch and that which will go through such a screen. The exact proportions of the two resulting lots depend upon the particular rock which is used but ordinarily there will be about equal quantities of each. If I am proceeding upon my usual basis of 1250 pounds of phosphate rock to 850 pounds of acid I thereupon mix say 625 pounds of the above coarse rock with the entire 850 pounds of acid. For convenience herein I formulate on the basis of 2100 pounds of material per ton, the extra one hundred pounds allowing generously for shrinkage. Except as stated sulphuric acid is calculated at 60 degrees Baumè at 60 degrees Fahrenheit, all as is explained at length in my said parent applications. This mixing may be carried out in an ordinary superphosphate mixer for from one to three minutes or the acid and course rock may be placed in a separate vat and slowly agitated until it is needed for use. Since this is a liquid and not even a plastic mass, the power required is comparatively small. By mixing the coarse rock, which is approximately one-half of the total, with all of the acid I secure maximum peneration of the coarse particles by the acid and utilize the strong acid where it is most needed.

After this first stage, if I have used an ordinary superphosphate mixer, I thereupon add 525 of the 625 pounds of relatively fine rock and mix in the usual way. If, however, I have carried out this first stage in a separate vat, I thereupon place the liquid mass of coarse phosphate rock and acid in an ordinary superphosphate mixer and add the 525 pounds of rock and proceed as usual. In any case in this second stage I carry out the mixing merely long enough thoroughly to wet the entire mass and thereupon discharge the mixture into a den.

In a conventional manner I remove this mixture from the den and while it is still chemically active and preferably while still hot and steaming place it in a pelleting drum, as described and claimed in my said co-pending parent applications. This pelleting drum is merely a long cylinder which is slowly revolved with the material therewithin being tumbled upon itself to form it into embryo pellets. This step, relatively short, is without kneading or disintergration, with a relatively large volume of material always in close physical contact, and without heating or other form of dehydration. Its sole purpose is the physical one of molding or rolling the material into small pellets. Thereupon while the drum is revolving and during the latter stage of the pelleting I add the remaining one hundred pounds of rock as a coating material. This one hundred pounds of rock represents approximately five percent of the finished (shrunk) ton. The result is a dry and free-flowing superphosphate of the characteristics described and claimed in my said co-pending ultimate parent application. This pelleting operation may be carried out according to any of the methods described and claimed in my said ultimate parent application. I may add other fertilizer materials to the pelleting drum, or to my novel den and both mix and pellet therein.

It should be pointed out herein also that the degree of concentration of the acid is of importance is connection with the end results of my pelleting operation, which produces pellets of the type which I have defined in said ultimate parent as "closed." Since these pellets are not the product of a breaking or kneading operation their size is controlled only by the amount of water in the material to be pelleted and the duration and character of the agitation of the mass within a drum or the like. The larger the ratio of water to total materials the larger will be the resulting pellet other factors being equal. I preferably start with a freshly ex-denned superphosphatic material of which the free moisture content is between about nine and twelve percent. If the pellets are to be of uniform size, as is desirable, it is necessary that a uniform amount of water be distributed throughout the entire mass. The most satisfactory way known to me to accomplish this result is to employ acid in the original mixing operation of that degree of concentration which furnishes the amount of moisture which results in pellets of the desired size and to depend upon the chemical activity of the mixing operation to distribute that moisture uniformly in all parts of the mass. One must consider, however, varied conditions of manufacture and greatly differing characteristics and quantities of the particular materials with which the superphospate is mixed to form pellets. I have found it possible to produce a total pelleted product of which 95% or more is of any reasonable and desired size, without a screening or cracking or other sizing operation.

Whether I control the amount of moisture by the concentration of acid, as is generally very much preferable, or add moisture as such, I am always limited to an amount which will not exceed that which the particular mass which I am handling can utilize effectively as water of crystallization. Since I dry by crystallization only, I can not add moisture which will remain after crystallization has been completed. As a practical matter no difficulties are caused by this factor since the foregoing limits while critical are sufficiently wide so that I have always found it practicable to use acid of a concentration within the usual range of from fifty-two to fifty-six degrees Baumé. Therefore I am able to control the size of the pellets by using a concentration which also meets ordinary economic and manufacturing considerations.

The small amount of free acid on the surface of the pellet and the crystallization of the major fertilizer materials firmly bind the coating to the body of the pellet. The introduction of coating material late in the pelleting operation and its restriction to the surface of the pellets coats their surfaces, renders the pellets permanent, utilizes the remaining fee acid and accomplishes my characteristic result. Although I prefer ground phosphate rock, I may utilize any other finely divided absorptive material, much preferably of value to plant life and one with which the free acid reacts. In production of superphosphate by others neutralizing mateials of no value to plant life are generally used to neutralize remaining free acid. As pointed out in my ultimate parent application, however, I have effectively used chemically inert coating materials such as charcoal. After their formation my pellets must be stored so that they do not re-heat or otherwise dehydrate, if the full chemical results of my invention are to be enjoyed. Aeration by long continued rolling in a pelleting or other drum, vacuum drying by an autoclave or otherwise, continued aeration as by repeated crane movements or a current of cool air long continued are other forms of dehydation which must be avoided. My pellets must be permitted to crystallize dry without dehydration. My pellets may be used within a very few hours after pelleting but the availability slowly increases.

If I do not care to pellet the material it is merely kept from heating and dehydration by the methods and means described in my said ultimate parent application, as for example, my novel ventilated pile or car, or by storage in piles which are so small that the contents of said piles do not reset. After the material, whether fine or pelleted, is removed from the den it is essential to the complete practice so that the water necessary for crystallization is maintained.

My product so far as I am aware is entirely unique in that in its finished form there is substantially the same amount of total moisture—that is free moisture plus the water of crystallization—as appears in the freshly denned or freshly mixed materials respectively from which the product is made. In all other processes known to me this total moisture materially decreases. In whatever form, my product contains a much greater amount of truly water-soluble phosphate than previously has been secured in a superphosphate, so far as known to me. I use the term "water-soluble" in its true scientific meaning and not as loosely employed in the fertilizer industry to mean "water-extractable," all as explained in my ultimate parent application. My truly water-soluble persistent acidic salt is closely associated with the greater crop-producing capacity of my products per unit of $P_2O_5$.

In the practice of this invention and those described and claimed in my said co-pending parent applications like others I may use so-called "spent" sulphuric acid, that is, acid without impurities except those common to low grade commercial $H_2SO_4$ and of concentration lower than that ordinarily widely used except in the fertilizer industry. For spent or other sulphuric acid, I may substitute so-called "sludge acid." Sludge acid is a term given to an inexpensive sulphuric acid which has been used in the purification of petroleum products or crude benzine and contains oils, gums and other impurities. Although this term is occasionally applied loosely to such sulphuric acid from which the sludge has been removed through an extensive process of purification or regeneration and concentration, such acid then except for some discoloration and odor being similar to ordinary sulphuric acid, I use this term in this specification and the sub-joined claims as limited to such acid before extensive purification and while still gummy and sticky and containing a considerable amount of oils, gums, or other impurities. Previously only small amounts of this acid have been usable in the fertilizer industry. It is so gummy and sticky that in the conventional processes of fertilizer manufacture it results in a product which is likewise gummy and sticky and is difficult to handle and slow to dry, if indeed it dries at all. It is practicable and desirable, however, for sulphuric acid of this type to be employed in the practice of this invention and those of my said parent applications, except in the circumstances stated below. Since the effective sulphuric acid potential of this acid may be equivalent to a fresh acid of a concentration of no more than thirty-five to forty degrees Baumé, I find it necessary to add a sufficient quantity of concentrated sulphuric acid to bring the effectiveness up to whatever point is necessary. The gummy and sticky nature of this acid is positively helpful in a pelleting operation of the sort described and claimed herein and in my said co-pending applications, provided, of course, the critical steps hereof and thereof are followed. It tends to hold together the individual particles of a pellet which is later coated with dry phosphate rock or other finely divided material which seals the pellet and forms a structure the exterior of which is dry and hard.

Sludge acid is characterized by a very strong and persistent odor which has been found to be pleasing to farmers but is objectionable to others. A dark color which is given to a product by this acid likewise is pleasing to fertilizer consumers. This odor, however, is so persistent and so generally objectionable that this type of acid cannot well be used in a process which produces hydrochloric acid as a by-product, for example, as taught in my co-pending application Serial Number 222,536, filed April 23, 1951, a continuation-in-part of my said parent application Serial Number 450,324. Said acid can be used in other processes thereof as will be evident from said immediate parent application.

This sludge sulphuric acid, brought to a desired concentration of between 52 and 56 degrees Baumé, is used exactly as ordinary sulphuric acid, as described above and in said parent applications. My use of such acid is in no way limited to any two-stage process, with or without division of the phosphate rock on the basis of particle size. While I prefer pelleting I use such acid when desired in the making of relatively fine or granulated superphosphatic products.

From the above portion of this specification it will be clear that a major object thereof is to present inventive substance which effects great economies in materials, notably sulphuric acid, labor, capital and time and in a virtually continuous two-stage operation produces an end product which is ready for use by a farmer within relatively a few hours thereafter and in which no plant food has been "neutralized" by the addition of material not of value to the plant.

Other advantages, objects and characteristics than those stated in the preceding portions of this specification are apparent from the preceding description and the sub-joined claims. Although I am stating preferred methods and steps, it will be readily understood that I am not in any way limited to these particular processes, as changes can be readily made without departing from the spirit of the invention or the scope of my broader claims.

I claim:

1. A process of manufacturing a pelleted superphosphatic fertilizer which comprises dividing ground phosphate rock into two portions one containing coarse particles and the other containing fine particles, mixing said coarse particles with sufficient sulphuric acid to acidulate all of said ground phosphate rock, adding to the over-acidulated sludge so formed all but a minor fraction of the remainder of said rock containing fine particles and agitating the mass so formed, promptly thereafter pelleting said mass while it is still chemically active, and adding thereto during a late stage of the pelleting operation the said minor fraction of said finely divided rock as a coating material which is thereby bonded to the body of the pellet and becomes palpably dry and thereafter maintains the integrity of the pellet.

2. A process of manufacturing a fertilizer which comprises dividing ground phosphate rock which is ground relatively coarsely into two portions, one containing coarse particles and the other containing fine particles, mixing said coarse particles with sufficient sulphuric acid to acidulate all of said ground phosphate rock, and adding to the over-acidulated liquid containing sludge so formed the remainder of the phosphate rock and agitating the mass so formed.

3. A process of manufacturing a fertilizer which comprises dividing ground phosphate rock which is ground relatively coarsely into two portions, one containing coarse particles and the other containing fine particles, mixing said coarse particles with sufficient sulphuric acid to acidulate all of said ground phosphate rock, adding to the over-acidulated liquid-containing sludge so formed the remainder of the phosphate rock, and tumbling upon itself the mass so formed to make it into pellets.

4. A process of manufacturing a pelleted superphosphatic fertilizer which comprises dividing phosphate rock into two portions on the basis of particle size, mixing the relatively coarse of said particles with sufficient sulphuric acid to acidulate all of said ground phosphate rock, the ratio of sulphuric acid calculated at 60 degrees Baumé to total phosphate rock being as 850 is to 1250, adding to the over-acidulated liquid-containing sludge so formed all but a minor fraction of the remainder of said rock containing fine particles and agitating the mass so formed, said minor fraction being of the order of five percent of the resulting end net product, promptly thereafter pelleting said mass while it is still chemically active, and adding thereto during a late stage of the pelleting operation the said minor fraction of said finely divided rock as a coating material which is thereby bonded to the body of the pellets becomes palpably dry and thereafter maintains the integrity of the pellets.

5. A process of manufacturing a superphosphatic fertilizer which comprises grinding phosphate rock relatively coarsely, dividing the rock so ground into two substantially equal portions one containing relatively coarse particles and the other containing relatively fine particles, mixing said coarse particles and sufficient sulphuric acid to acidulate all of said ground phosphate rock, adding to the over-acidulated liquid-containing sludge so formed the fine particles which make up the remainder of the phosphate rock, and agitating the mass so formed.

6. A process of manufacturing a pelleted superphosphatic fertilizer which comprises grinding phosphate rock relatively coarsely, dividing the rock so ground into two substantially equal portions one containing relatively coarse particles and the other containing relatively fine particles, mixing said coarse particles and sufficient sulphuric acid to acidulate all of said ground phosphate rock, adding to the over-acidulated liquid-containing sludge so formed the fine particles which make up the remainder of the phosphate rock, and tumbling the mass so formed upon itself to pellet it.

7. A process of manufacturing a superphosphatic fertilizer which comprises grinding phosphate rock relatively coarsely, dividing the rock so ground into two substantially equal portions one containing relatively coarse particles and the other containing relatively fine particles, mixing said coarse particles and sufficient sulphuric acid to acidulate all of said ground phosphate rock, adding to the over-acidulated liquid-containing sludge so formed a major fraction of the fine particles which make up the remainder of the phosphate rock, tumbling the mass so formed upon itself to form pellets, and in a late stage of the pelleting operation adding the minor fraction of said fine particles which thereupon adhere to the pellets and dry their surfaces and are bonded thereto by the reaction between the previously unreacted phosphate rock of said minor fraction and the free acid which remains upon the surface of the pelleets prior to the addition of said minor fraction of said fine particles.

8. A process of manufacturing a pelleted superphosphatic fertilizer which comprises dividing phosphate rock into two portions of substantially equal quantity on the basis of particle size, mixing the relatively coarse of said particles with sufficient sulphuric acid to acidulate all of said ground phosphate rock, adding to the over-acidulated liquid-containing sludge so formed all by a minor fraction of said rock containing fine particles and agitating the mass so formed, said minor fraction being of the order of five percent of the resulting end net product, promptly thereafter pelleting said mass while it is still chemically active, and adding thereto during a late stage of the pelleting operation the said minor fraction of said finely divided rock as a coating material which is thereby bonded to the body of the pellets becomes palpably dry and thereafter maintains the integrity of the pellets.

9. A process of manufacturing a superphosphatic fertilizer which comprises grinding phosphate rock so that approximately all thereof will pass through a screen having 50 meshes to the square inch, thereafter separating this material into that which remains on a screen of the order of 100 meshes to the square inch and that which will go through such a screen, mixing the coarse particles so separated and sufficient sulphuric acid to acidulate all of said ground phosphate rock, adding to the over-acidulated liquid-containing sludge so formed the fine particles which make up the remainder of the phosphate rock, and agitating the mass so formed.

10. A process of manufacturing pelleted superphosphate which comprises mixing phosphate rock and an inorganic acid consisting essentially of sludge sulphuric acid admixed with sufficient added fresh sulphuric acid so that the admixture has a concentration between about 52° and 56° Baumé, pouring the resulting material into a den, removing the material from the den while it is still moist, agitating the material substantially immediately thereafter to form it into pellets, drying the surface of the pellets by coating them with an absorptive material, and so handling the pellets that the temperature thereof during and after their formation decreases relatively rapidly and substantially continuously.

11. A process of manufacturing free-flowing pelleted superphosphate which comprises: mixing ground phosphate rock and an inorganic acid of about 52° to 56° Baumé, said acid including a substantial amount of sludge sulphuric acid containing a substantial proportion of gummy and sticky impurities; after the mixture has set and while it is still moist and warm from the mixing operation and chemically active, but before it has cured, removing the mixture from the den and disintegrating it; promptly thereafter forming the disintegrated mass into pellets in the absence of external heat and under other conditions which avoid any substantial evaporation, the presence of the gummy and sticky impurities assisting in the pelleting operation.

12. A process of manufacturing dry and free-flowing pelleted superphosphate which comprises: concentrating sludge sulphuric acid by the addition of sufficient concentrated sulphuric acid to bring the acid mixture within a range of from 52° to 56° Baumé, said sludge sulphuric acid retaining as impurities therein a substantial amount of gums and oils; mixing said concentrated sludge sulphuric acid with phosphate rock; placing the mixture in a den; as soon as the mixture has hardened sufficiently to hold its form, disintegrating it and agitating the disintegrated mixture to form pellets so that the superphosphate continues to cure in pelleted form, the pelleting being conducted in the absence of heat and under conditions which avoid any substantial evaporation so as to obtain a dry pelleted product, the presence of the said impurities in the acid promoting pellet formation, the concentrated sludge sulphuric acid providing just sufficient water for the acidulation, for the subsequent evaporation caused by the heat of the reaction, and for the full amount required as water of crystallization for the final hydrated product.

13. A process of manufacturing a dry and free-flowing pelleted superphosphate which comprises: mixing sludge sulphuric acid which retains therein a substantial portion of its original gummy and sticky impurities with sufficient concentrated sulphuric acid to bring the concentration of the sludge acid within a range of from fifty-two to fifty-six degrees Baumé; mixing said sludge acid and phosphate rock; after the mixture has set and while it is still moist and warm from the mixing operation and chemically active but before it has cured, forming it into pellets, said gummy and sticky impurities assisting as a binder in said pelleting operation; and coating the pellets so formed while still moist from said mixing operation with a dry absorptive material, said coating being effective to preserve the identity of the pellets thereafter.

14. A process of manufacturing a pelleted superphosphatic fertilizer which comprises dividing ground phosphate rock into two portions, one containing coarse particles and the other containing fine particles, mixing said coarse particles with sufficient sulphuric acid composed of unregenerated sludge sulphuric acid containing therein a substantial amount of oils and gums and concentrated sulphuric acid to acidulate all of said ground phosphate rock, adding to the over-acidulated sludge so formed all but a minor fraction of the remainder of said rock containing fine particles and agitating the mass so formed, thereafter pelleting said mass while it is still chemically active, the presence of said oils and gums from said sludge acid assisting in the pelleting operation, and adding thereto in a late stage of the pelleting operation the said minor fraction of said finely divided rock as a coating material, the concentration of the acid being such as to supply not more than the amount of water required in the acidulation reaction and evaporated by the natural heat of reaction and the amoount required to furnish substantially the full amount of water of crystallization for the completely hydrated product and the above processing being carried out without the addition of external heat and under conditions avoiding any substantial evaporation thereby obtaining a dry end product.

15. A process of manufacturing a pelleted superphosphatic fertilizer which comprises dividing ground phosphate rock into two portions, one containing coarse particles and the other containing fine particles, mixing said coarse particles with sufficient sulphuric acid composed of unpurified sludge sulphuric acid and concentrated sulphuric acid to acidulate all of said ground phosphate rock, said sludge sulphuric acid retaining therein a substantial amount of the gummy and sticky impurities characteristic of such acid before extensive purification, adding to the over-acidulated liquid-containing mass so formed all but a minor fraction of the remainder of said rock containing fine particles and agitating the mass so formed, thereafter pelleting said mass while it is still chemically active, and adding thereto during a late stage of the pelleting operation the said minor fraction of said finely divided rock as a coating material, said gummy and sticky impurities assisting in the pelleting operation.

16. A process of manufacturing a fertilizer which comprises dividing phosphate rock which is ground relatively coarsely into two portions, one containing coarse particles and the other containing fine particles, mixing said coarse particles with sufficient sulphuric acid which is a mixture of sludge sulphuric acid and concentrated sulphuric acid to acidulate all of said two portions of said ground phosphate rock, said sludge sulphuric acid retaining a substantial amount of impurities therein, and adding to the over-acidulated plastic sludge so formed the remainder of the phosphate rock and agitating the mass so formed, the concentration of the acid being such as to supply not more than the amount of water required in the acidulation reaction and evaporated by the natural heat of reaction and the amount required to furnish substatially the full amount of water crystallization for the completely hydrated product and the above processing being carried out without the addition of external heat and under conditions avoiding any substantial evaporation thereby obtaining a dry end product.

17. A process of manufacturing superphosphate which comprises dividing ground phosphate rock into a major portion comprising relatively coarse rock particles substantially all of which are retained on a 100-mesh screen and a minor portion comprising relatively fine rock particles substantially all of which pass through a 100-mesh screen, mixing said major portion and the entire amount of an acid necessary to form superphosphate of a given strength from all of said phosphate rock thereby producing an over-acidulated liquid-containing mass which can be readily handled, the extra acid preventing the mixture so formed from forming into a hard mass, the concentration of the acid being such as to supply not more than the amount of water required in the acidulation reaction of the entire amount of phosphate rock and evaporated by the natural heat of reaction and the amount required to furnish substantially the full amount of water of crystallization for the completely hydrated final product, and thereafter mixing said mass and said minor portions of the phosphate rock and continuing the agitation of the resulting mass so that the addition of said second portion of rock to the mass produces a product which breaks up into small pellets coated by the rock of the second portion which are thereby made sufficiently palpably dry so that during subsequent storage they will not coalesce.

18. A process of manufacturing a pelleted phosphatic fertilizer which comprises dividing ground phosphate rock into two portions one containing coarse particles and the other containing fine particles, mixing said coarse particles with sufficient acid to acidulate all of said ground phosphate rock, adding to the over-acidulated sludge so formed all but a minor fraction of the remainder of said rock containing fine particles and agitating the mass so formed, promptly thereafter pelleting said mass while it is still chemically active, and adding thereto during a late stage of the pelleting operation the said minor fraction of said finely divided rock as a coating material which is thereby bonded to the body of the pellets and becomes palpably dry and thereafter maintains the integrity of the pellet.

References Cited in the file of this patent

UNITED STATES PATENTS

| | | |
|---|---|---|
| 389,566 | Glaser | Sept. 18, 1888 |
| 1,146,222 | Willson et al. | July 13, 1915 |
| 1,604,359 | Larison | Oct. 26, 1926 |
| 1,871,195 | Ober et al. | Aug. 9, 1932 |
| 1,916,114 | Ober et al. | June 27, 1933 |
| 2,015,384 | Nordengren | Sept. 24, 1935 |
| 2,061,567 | Facer | Nov. 24, 1936 |
| 2,106,223 | Nordengren | Jan. 25, 1938 |
| 2,136,793 | Gabeler et al. | Nov. 15, 1938 |